UNITED STATES PATENT OFFICE.

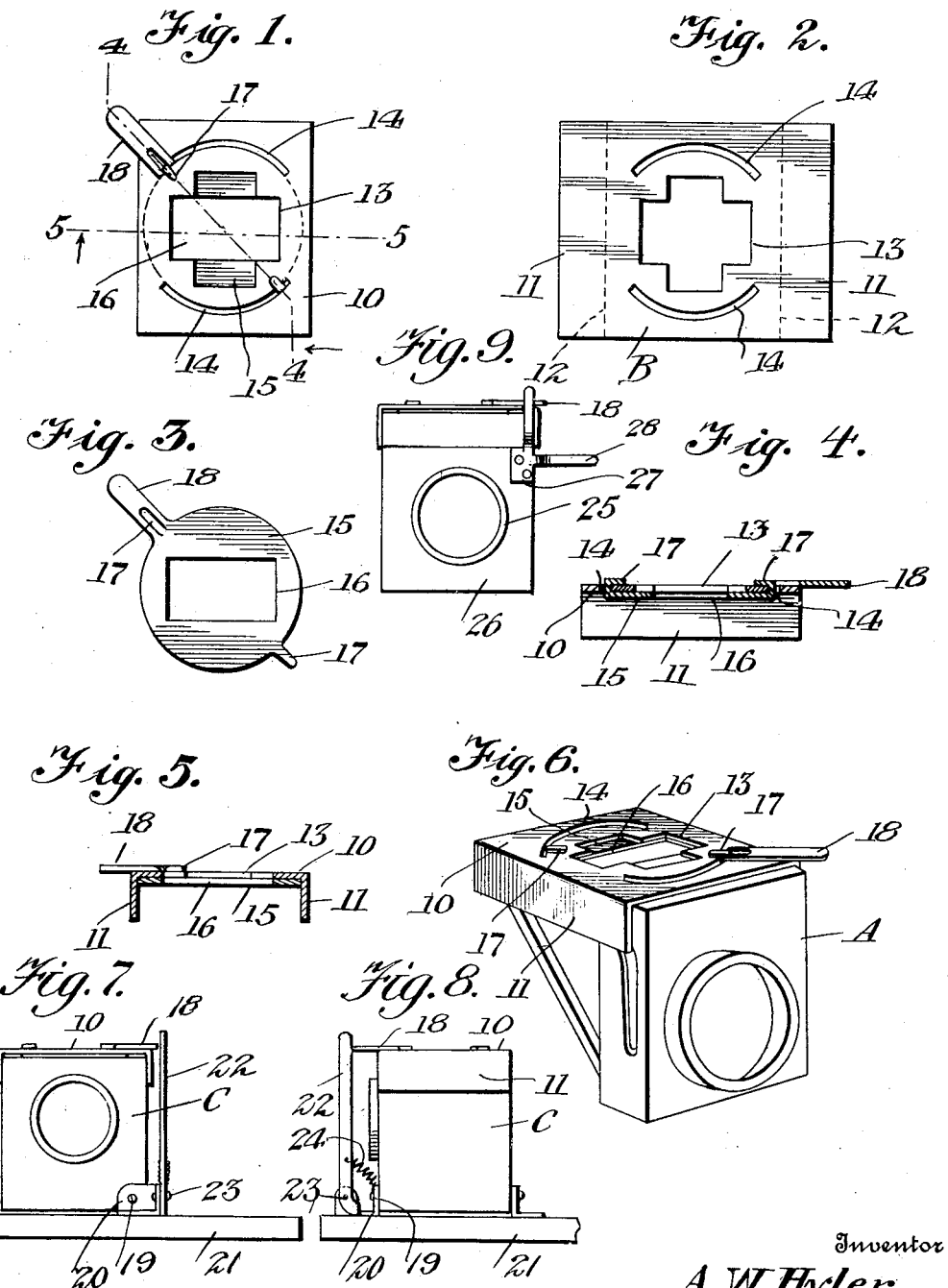

AARON WINCHENBACH HYLER, OF THOMASTON, MAINE.

VIEW-FINDER ATTACHMENT FOR CAMERAS.

1,181,453. Specification of Letters Patent. Patented May 2, 1916.

Application filed October 26, 1915. Serial No. 58,052.

*To all whom it may concern:*

Be it known that I, AARON W. HYLER, a citizen of the United States, residing at Thomaston, in the county of Knox and State of Maine, have invented new and useful Improvements in View-Finder Attachments for Cameras, of which the following is a specification.

The invention relates to a view finder attachment, and more particularly to the class of adjustable shutter attachments for view finders on cameras.

The primary object of the invention is the provision of an attachment of this character wherein, on positioning the camera for the taking of a picture, the area of the view for the picture can be accurately determined, thereby enabling the operator to know definitely the visible image which will appear in the picture.

Another object of the invention is the provision of an attachment of this character wherein the shutter is mounted in a novel manner so that it can be conveniently adjusted to permit the accurate vision in the finder when the camera is turned for the purpose of taking a picture with the long side edges of the film or plate in a vertical or horizontal position, as the occasion may require.

A further object of the invention is the provision of an attachment of this character wherein the shutter is automatically operated on the turning of the finder for the purpose of taking a picture with the long side edges of the film or plate in a vertical or horizontal position.

A further object of the invention is the provision of an attachment of this character which is simple in construction, thoroughly reliable and efficient in operation, readily and easily applied to and removed from the finder of a camera, and also one which is inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a top plan view of an attachment constructed in accordance with the invention. Fig. 2 is a plan view of the blank of the body thereof. Fig. 3 is a plan view of the shutter. Fig. 4 is a vertical longitudinal sectional view through the attachment. Fig. 5 is a sectional view on the line 5—5 of Fig. 1. Fig. 6 is a perspective view of the attachment mounted upon the photographic view finder. Fig. 7 is a front view of a finder disclosing a modification showing the automatic adjustment of the shutter. Fig. 8 is a fragmentary side elevation thereof. Fig. 9 is a front elevation of a further modified form showing the automatic adjustment of the shutter.

Similar reference characters indicate corresponding parts throughout the several views in the drawing.

Referring to the drawing in detail, A designates the casing of a photographic view finder which is made as usual in the general shape, and in the front of which is fitted the usual object lens which coöperates with a reflector mirror internally of the casing and disposed at a forty-five degree angle, while at the top of the said casing is a magnifying lens, these parts, together with the casing, being constructed in the usual well-known manner, and the said casing is swingingly supported upon the case of a camera, so that when the said camera is turned for the purpose of taking a picture with its long side edges in a horizontal or in a perpendicular position, as the case may be, the finder can be correspondingly shifted so that the image visible therethrough can be accurately determined as it would appear in the picture by the use of the attachment hereinafter fully described.

The attachment comprises a plate 10 formed at its long side edges with right angular flanges 11 which are bent from the plate on the fold line 12, the said plate being made from a single blank B, and is cut centrally thereof to provide the cross-shaped opening 13, while at opposite sides of this opening are provided arcuate shaped slots 14, and this plate is detachably engaged upon the top of the view finder A by frictional contact of the flanges 11 with the sides thereof, the arcuate shaped slots 14 being for a purpose presently described.

Arranged beneath the plate 10 between the flanges 11 is a disk-like shutter 15 provided with a rectangular shaped opening 16 therein adapted for registration with the opening 13 to coincide with the longitudinal extent of the arms of the cross-shaped opening when the shutter is adjusted. Struck from the peripheral edge of the shutter 15 are ears 17 which are at diametrically opposite points and are passed upwardly through the arcuate-shaped slots 14 and are then bent parallel with the shutter, and in this manner the latter is rotatably connected with the plate 10 in a position for the registration of the opening 16 with the two rectangular lengths of the opening 13 in the plate 10. Formed at the peripheral edge of the said shutter 15 is a lever 18 which permits the manual turning of the shutter for the adjustment thereof to bring the opening 16 into registration with either of the arms of the cross-shaped opening 13 in the plate 10, as the occasion may require when the camera is turned for the positioning of the film or plate therein with the long side edges in a horizontal or in a perpendicular position, and in this manner the operator can accurately determine the area of the view that will be precisely included in the picture, and no more, thus dispensing with the necessity of mentally eliminating portions of the image, as is usually necessary.

In Figs. 7 and 8 there is shown a slight modification of the invention wherein the finder C, which is of the ordinary well-known construction, is pivoted at 19 to a bearing 20 supported upon the swinging front 21 of the camera, and upon this finder is supported the attachment hereinbefore described, having the adjustable shutter with the lever 18 which is projected into the path of a resilient trip member 22 hinged at 23 to the bearing 20, and to this member 22 is connected the spring 24 which normally holds the same into the path of the lever 18 so that on the turning of the finder C the member 22 will act upon the lever for automatically shifting the shutter. The member 22, by reason of the connection of the spring 24 therewith, can ride over the end of the lever 18 to permit the complete turning of the finder C when the shutter is automatically shifted during such turning movement.

In Fig. 9 there is shown a further modification of the invention, wherein the view finder has its lens ring or rim 25 swiveled in a front bearing plate 26 which is fixedly mounted as usual on the body of the camera, so that in this manner the said view finder can be swung at right angular position, and on its bearing plate 26 at the upper right hand corner is fixed the base 27 of double trip arms 28 which are arranged at right angles to each other and extend in the path of the lever 18 so that on the swinging of the view finder the shutter will be automatically operated in a similar manner with respect to the operation of the shutter shown in Figs. 7 and 8 of the drawing.

It is of course understood that the attachment for the view finder can be mounted thereon in any desirable manner other than by frictional contact of the flanges 11 with the sides of the said finder.

It is of course understood that the size of the attachment must be varied accordingly with respect to the various sizes of photographic view finders and the cameras on which the same are mounted.

From the foregoing description, taken in connection with the accompanying drawing, the construction and manner of operation of the device will be clearly understood, and therefore a more extended explanation has been omitted.

What is claimed is:—

The combination with a rotatably supported view finder, of an inverted U-shaped plate adapted to be detachably supported upon the view finder and having a cross shaped opening therein and arcuate shaped slots at opposite sides of the said opening, a disk arranged beneath the plate and having a rectangular shaped opening for registration with either of the cross arms of the said opening in the plate, a handle formed at the periphery of the disk and projected through one of the arcuate shaped slots, an ear formed on the periphery of the disk diametrically opposite the handle and bent upwardly and inwardly through the other arcuate shaped slot, an ear cut from the handle and bent upwardly and inwardly to engage the plate and coöperate with the other ear for rotatably mounting the disk on said plate, and means mounted to project into the path of movement of the handle for actuating the same on the turning of the view finder for changing the position of the opening in the disk relative to the opening in the plate.

In testimony whereof I affix my signature in presence of two witnesses.

AARON WINCHENBACH HYLER.

Witnesses:
HATTIE E. HYLER,
LUCY E. WINCHENBACH.